United States Patent
Quan et al.

(10) Patent No.: US 9,918,334 B2
(45) Date of Patent: Mar. 13, 2018

(54) PROCESSING METHOD FOR DATA TRANSMISSION, APPARATUS, AND SYSTEM

(71) Applicant: Huawei Technologies Co., Ltd., Shenzhen, Guangdong (CN)

(72) Inventors: Wei Quan, Beijing (CN); Jian Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 156 days.

(21) Appl. No.: 14/932,776

(22) Filed: Nov. 4, 2015

(65) Prior Publication Data

US 2016/0057771 A1    Feb. 25, 2016

Related U.S. Application Data

(63) Continuation of application No. PCT/CN2013/075270, filed on May 7, 2013.

(51) Int. Cl.
*H04L 1/18*    (2006.01)
*H04W 72/12*    (2009.01)

(52) U.S. Cl.
CPC ....... *H04W 72/1278* (2013.01); *H04L 1/1812* (2013.01); *H04L 1/1864* (2013.01);
(Continued)

(58) Field of Classification Search
None
See application file for complete search history.

(56) References Cited

U.S. PATENT DOCUMENTS

2009/0103500 A1* 4/2009 Malkamaki .......... H04L 1/1812
370/336
2009/0287976 A1* 11/2009 Wang .................... H04L 1/1812
714/748

(Continued)

FOREIGN PATENT DOCUMENTS

CN    101132262 A    2/2008
CN    103023629 A    4/2013

OTHER PUBLICATIONS

"3rd Generation Partnership Project; Technical Specification Group Radio Access Network; Evolved Universal Terrestrial Radio Access (E-UTRA); Multiplexing and channel coding (Release 11)", 3GPP TS 36.212 V11.2.0, Feb. 2013, 82 pages.

(Continued)

*Primary Examiner* — Chi H Pham
*Assistant Examiner* — Soon-Dong D Hyun (57) ABSTRACT

Embodiments of the present invention provide a processing method for data transmission, an apparatus and a system. The method includes: receiving scheduling signaling sent by a base station, where the scheduling signaling includes a hybrid automatic repeat request (HARQ) process ID; and transmitting, within a same transmission time interval TTI, on a process that corresponds to the HARQ process identifier, data on a first logical channel element and data on a second logical channel element. According to the processing method for data transmission, the apparatus, and the system provided in the embodiments of the present invention, utilization of bandwidth resources for data transmission is improved. Therefore, data throughput of UE can be also effectively ensured.

20 Claims, 3 Drawing Sheets

(52) U.S. Cl.
CPC .......... *H04L 1/1887* (2013.01); *H04L 1/1896* (2013.01); *H04W 72/1289* (2013.01)

(56) References Cited

U.S. PATENT DOCUMENTS

| | | | | |
|---|---|---|---|---|
| 2010/0067459 | A1* | 3/2010 | Goransson | H04L 1/06 370/329 |
| 2010/0115358 | A1* | 5/2010 | Kotecha | H04L 1/1812 714/748 |
| 2011/0047430 | A1* | 2/2011 | Feuersanger | H04L 1/1812 714/748 |
| 2011/0093755 | A1* | 4/2011 | Gao | H04L 1/1896 714/748 |
| 2012/0014328 | A1* | 1/2012 | Goransson | H04L 1/06 370/328 |
| 2013/0301620 | A1 | 11/2013 | Goeransson et al. | |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.2.0, Mar. 2013, 56 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, 344 pages.

\* cited by examiner

PROCESSING METHOD FOR DATA TRANSMISSION, APPARATUS, AND SYSTEM

CROSS-REFERENCE TO RELATED APPLICATIONS

This application is a continuation of International Application No. PCT/CN2013/075270, filed on May 7, 2013, which is hereby incorporated by reference in its entirety.

TECHNICAL FIELD

Embodiments of the present invention relate to the field of wireless communications technologies, and in particular, to a processing method for data transmission, an apparatus, and a system.

BACKGROUND

In Long Term Evolution (LTE for short below) and LTE-Advanced (LTE-A for short below) systems, a base station schedules uplink/downlink data by using scheduling signaling transmitted on a physical downlink control channel (PDCCH for short), where the scheduling signaling includes a physical resource used by user equipment (UE for short below) to receive downlink data on a physical downlink shared channel (PDSCH for short below) or to send uplink data on a physical uplink shared channel (PUSCH for short below), that is, a time-frequency resource, a modulation and coding scheme and a redundancy version that are used for data transmission, and other information. In addition, data is transmitted and retransmitted in a hybrid automatic repeat request (HARQ for short below) manner in the LTE and LTE-A systems. During uplink transmission or downlink transmission, generally, only one HARQ process processes data within one transmission time interval (TTI for short below), and a same HARQ process is used for transmission and retransmission of same data, so as to obtain combined decoding gains. For downlink HARQ transmission, if scheduling signaling instructs UE to receive downlink data, the scheduling signaling also needs to include information such as an identifier of an HARQ process used by the UE to receive the data. After receiving the scheduling signaling, the UE decodes, on a notified physical resource by using the HARQ process, the downlink data according to the scheduling signaling, and feeds back a downlink data receiving status to a base station, so that the base station determines, according to the feedback, whether to perform retransmission. For uplink HARQ transmission, if scheduling signaling instructs UE to send uplink data, after receiving the scheduling signaling, the UE sends, on a notified physical resource by using an HARQ process, the uplink data according to the scheduling signaling, and receives an uplink data receiving status fed back by a base station and determines whether to perform retransmission, or receives uplink retransmission scheduling signaling sent by a base station and performs uplink retransmission.

In the LTE and LTE-A systems, one UE may simultaneously run multiple services with different quality of service (QoS) requirements, where different services correspond to different radio bearers (RB for short below), and each RB corresponds to one logical channel (LCH for short below). To improve resource utilization, before transmission of data on different RBs, multiplexing processing may be performed on the data on different RBs according to some multiplexing criteria (such as RB priority information, and a rate requirement that corresponds to the RB), that is, data on multiple different RBs that is to be transmitted is encapsulated into one media access control protocol data unit (MAC PDU for short below). During multiplexing, whether different RBs can be multiplexed needs to be further considered based on some parameters, for example, a maximum quantity of times of HARQ transmission or retransmission at a MAC layer (including a total quantity of times of transmission and retransmission). Considering that different services have different requirements on delay and reliability, different maximum quantities of times of HARQ transmission or retransmission may be used during transmission of data on different RBs, and data on RBs that has different quantities of times of HARQ transmission cannot be multiplexed in a same MAC PDU.

It can be seen that, the use of RB multiplexing to improve resource utilization in the prior art is limited by some parameters and multiplexing criteria, which causes that bandwidth resources cannot be fully used during transmission, and therefore data throughput of UE cannot be effectively ensured.

SUMMARY

Embodiments of the present invention provide a processing method for data transmission, an apparatus, and a system, to fully use bandwidth resources when uplink/downlink data is scheduled, thereby effectively ensuring data throughput of UE.

According to a first aspect, an embodiment of the present invention provides a processing method for data transmission, including:

receiving scheduling signaling sent by a base station, where the scheduling signaling includes a hybrid automatic repeat request (HARQ) process ID; and transmitting, within a same transmission time interval (TTI), on a process that corresponds to the HARQ process ID, data on a first logical channel element and data on a second logical channel element.

In a first possible implementation manner of the first aspect, the receiving scheduling signaling sent by a base station includes:

receiving, within the same TTI, first scheduling signaling and second scheduling signaling that are sent by the base station, where the first scheduling signaling and the second scheduling signaling respectively include a first HARQ process ID and a second HARQ process ID; and correspondingly, the transmitting, within a same TTI, on a process that corresponds to the HARQ process ID, data on a first logical channel element and data on a second logical channel element includes:

respectively transmitting, within the same TTI, on processes that correspond to the first HARQ process ID and the second HARQ process ID, the data on the first logical channel element and the data on the second logical channel element.

With reference to the first possible implementation manner of the first aspect, in a second possible implementation manner of the first aspect, before the receiving scheduling signaling sent by a base station, the method further includes:

receiving a configuration message sent by the base station, where the configuration message is used to indicate a correspondence between the first HARQ process ID and the first logical channel element, and a correspondence between the second HARQ process ID and the second logical channel element; and correspondingly, the respectively transmitting, within the same TTI, on processes that correspond to the first HARQ process ID and the second HARQ process ID, the data on the first logical channel element and the data on the second logical channel element includes:

determining, according to the configuration message, the first logical channel element and the second logical channel element that respectively correspond to the first HARQ process ID and the second HARQ process ID; and respectively transmitting, on the processes that respectively correspond to the first HARQ process ID and the second HARQ process ID, the data on the first logical channel element and the data on the second logical channel element.

With reference to the second possible implementation manner of the first aspect, in a third possible implementation manner of the first aspect, the configuration message includes:

first identifier information of the first logical channel element;

second identifier information of the second logical channel element;

the first HARQ process ID, corresponding to the first identifier information; and the second HARQ process ID, corresponding to the second identifier information.

With reference to the method described in any one of the first aspect to the third possible implementation manner of the first aspect, in a fourth possible implementation manner of the first aspect, the first HARQ process ID is the same as or different from the second HARQ process ID.

With reference to the first aspect, in a fifth possible implementation manner of the first aspect, the receiving scheduling signaling sent by a base station includes:

receiving third scheduling signaling, where the third scheduling signaling includes a third HARQ process ID; and correspondingly, the transmitting, within a same TTI, on a process that corresponds to the HARQ process ID, data on a first logical channel element and data on a second logical channel element includes:

transmitting, within the same TTI, on a process that corresponds to the third HARQ process ID, the data on the first logical channel element and the data on the second logical channel element.

With reference to the fifth possible implementation manner of the first aspect, in a sixth possible implementation manner of the first aspect, before the receiving scheduling signaling sent by a base station, the method further includes:

receiving a configuration message sent by the base station, where the configuration message is used to indicate a correspondence between the third HARQ process ID and the first logical channel element and the second logical channel element; and correspondingly, the transmitting, within the same TTI, on a process that corresponds to the third HARQ process ID, the data on the first logical channel element and the data on the second logical channel element includes:

determining, according to the configuration message, the first logical channel element and the second logical channel element that correspond to the third HARQ process ID; and transmitting, on the process that corresponds to the third HARQ process ID, the data on the first logical channel element and the data on the second logical channel element.

With reference to the sixth possible implementation manner of the first aspect, in a seventh possible implementation manner of the first aspect, the configuration message includes:

first identifier information of the first logical channel element;

second identifier information of the second logical channel element; and the third HARQ process ID, corresponding to the first identifier information and the second identifier information.

With reference to the first aspect, in an eighth possible implementation manner of the first aspect, the receiving scheduling signaling sent by a base station includes:

receiving fourth scheduling signaling, where the fourth scheduling signaling includes a fourth HARQ process ID and a fifth HARQ process ID; and correspondingly, the transmitting, within a same TTI, on a process that corresponds to the HARQ process ID, data on a first logical channel element and data on a second logical channel element includes:

respectively transmitting, within the same TTI, on processes that correspond to the fourth HARQ process ID and the fifth HARQ process ID, the data on the first logical channel element and the data on the second logical channel element.

With reference to the eighth possible implementation manner of the first aspect, in a ninth possible implementation manner of the first aspect, before the receiving scheduling signaling sent by a base station, the method further includes:

receiving a configuration message sent by the base station, where the configuration message is used to indicate a correspondence between the fourth HARQ process ID and the first logical channel element, and a correspondence between the fifth HARQ process ID and the second logical channel element; and correspondingly, the respectively transmitting, within the same TTI, on processes that correspond to the fourth HARQ process ID and the fifth HARQ process ID, the data on the first logical channel element and the data on the second logical channel element includes:

determining, according to the configuration message, the first logical channel element and the second logical channel element that respectively correspond to the fourth HARQ process ID and the fifth HARQ process ID; and respectively transmitting, on the processes that respectively correspond to the fourth HARQ process ID and the fifth HARQ process ID, the data on the first logical channel element and the data on the second logical channel element.

With reference to the ninth possible implementation manner of the first aspect, in a tenth possible implementation manner of the first aspect, the configuration message includes:

first identifier information of the first logical channel element;

second identifier information of the second logical channel element;

the fourth HARQ process ID, corresponding to the first identifier information; and the fifth HARQ process ID, corresponding to the second identifier information.

With reference to the method described in any one of the eighth possible implementation manner of first aspect to the tenth possible implementation manner of the first aspect, in an eleventh possible implementation manner of the first aspect, the fourth HARQ process ID is the same as or different from the fifth HARQ process ID.

With reference to the method described in any one of the second possible implementation manner of the first aspect, the third possible implementation manner of the first aspect, the sixth possible implementation manner of the first aspect, the seventh possible implementation manner of the first aspect, the ninth possible implementation manner of the first aspect, and the tenth possible implementation manner of the first aspect, in a twelfth possible implementation manner of the first aspect, the configuration message further includes:

a maximum quantity of times of HARQ transmission or retransmission of the first logical channel element; and a maximum quantity of times of HARQ transmission or retransmission of the second logical channel element.

With reference to the method described in any one of the first aspect to the twelfth possible implementation manner of the first aspect, in a thirteenth possible implementation manner of the first aspect, before the receiving scheduling signaling sent by a base station, the method further includes:

receiving indication information sent by the base station, where the indication information is used to instruct to transmit, within the same TTI, data on at least two logical channel elements.

With reference to the method described in any one of the first aspect to the thirteenth possible implementation manner of the first aspect, in a fourteenth possible implementation manner of the first aspect, the first identifier information of the first logical channel element includes a logical channel (LCH) ID or a logical channel group (LCG) ID; and the second identifier information of the second logical channel element includes a logical channel (LCH) ID or a logical channel group (LCG) ID.

According to a second aspect, an embodiment of the present invention provides a processing method for data transmission, including:

generating scheduling signaling, where the scheduling signaling includes a hybrid automatic repeat request (HARQ) process ID; and sending the scheduling signaling to user equipment (UE), to instruct the UE to transmit, within a same transmission time interval (TTI), on a process that corresponds to the HARQ process ID, data on a first logical channel element and data on a second logical channel element.

In a first possible implementation manner of the second aspect, the scheduling signaling includes first scheduling signaling and second scheduling signaling, and the first scheduling signaling and the second scheduling signaling respectively include a first HARQ process ID and a second HARQ process ID; and correspondingly, the sending the scheduling signaling to user equipment (UE) includes: sending, within the same TTI, the first scheduling signaling and the second scheduling signaling to the UE.

With reference to the first possible implementation manner of the second aspect, in a second possible implementation manner of the second aspect, before the sending the scheduling signaling to user equipment (UE), the method further includes:

sending a configuration message to the UE, where the configuration message is used to indicate a correspondence between the first HARQ process ID and the first logical channel element, and a correspondence between the second HARQ process ID and the second logical channel element.

With reference to the second possible implementation manner of the second aspect, in a third possible implementation manner of the second aspect, the configuration message includes:

first identifier information of the first logical channel element;

second identifier information of the second logical channel element;

the first HARQ process ID, corresponding to the first identifier information; and the second HARQ process ID, corresponding to the second identifier information.

With reference to the method described in any one of the second aspect to the third possible implementation manner of the second aspect, in a fourth possible implementation manner of the second aspect, the first HARQ process ID is the same as or different from the second HARQ process ID.

With reference to the second aspect, in a fifth possible implementation manner of the second aspect, the scheduling signaling includes third scheduling signaling, and the third scheduling signaling includes a third HARQ process ID.

With reference to the fifth possible implementation manner of the second aspect, in a sixth possible implementation manner of the second aspect, before the sending the scheduling signaling to user equipment (UE), the method further includes:

sending a configuration message to the UE, where the configuration message is used to indicate a correspondence between the third HARQ process ID and the first logical channel element and the second logical channel element.

With reference to the sixth possible implementation manner of the second aspect, in a seventh possible implementation manner of the second aspect, the configuration message includes:

first identifier information of the first logical channel element;

second identifier information of the second logical channel element; and the third HARQ process ID, corresponding to the first identifier information and the second identifier information.

With reference to the second aspect, in an eighth possible implementation manner of the second aspect, the scheduling signaling includes fourth scheduling signaling, and the fourth scheduling signaling includes a fourth HARQ process ID and a fifth HARQ process ID.

With reference to the eighth possible implementation manner of the second aspect, in a ninth possible implementation manner of the second aspect, before the sending the scheduling signaling to user equipment (UE), the method further includes:

sending a configuration message to the UE, where the configuration message is used to indicate a correspondence between the fourth HARQ process ID and the first logical channel element, and a correspondence between the fifth HARQ process ID and the second logical channel element.

With reference to the ninth possible implementation manner of the second aspect, in a tenth possible implementation manner of the second aspect, the configuration message further includes:

first identifier information of the first logical channel element;

second identifier information of the second logical channel element;

the fourth HARQ process ID, corresponding to the first identifier information; and the fifth HARQ process ID, corresponding to the second identifier information.

With reference to the method described in any one of the eighth possible implementation manner of the second aspect to the tenth possible implementation manner of the second aspect, in a tenth possible implementation manner of the second aspect, the fourth HARQ process ID is the same as or different from the fifth HARQ process ID.

With reference to the method described in any one of the second possible implementation manner of the second aspect, the third possible implementation manner of the second aspect, the sixth possible implementation manner of the second aspect, the seventh possible implementation manner of the second aspect, the ninth possible implementation manner of the second aspect, and the tenth possible implementation manner of the second aspect, in a twelfth possible implementation manner of the second aspect, the configuration message further includes:

a maximum quantity of times of HARQ transmission or retransmission of the first logical channel element; and a maximum quantity of times of HARQ transmission or retransmission of the second logical channel element.

With reference to the method described in any one of the second aspect to the twelfth possible implementation manner of the second aspect, in a thirteenth possible implementation manner of the second aspect, before the sending the scheduling signaling to user equipment (UE), the method further includes:

sending indication information to the UE, where the indication information is used to instruct the UE to transmit, within the same TTI, data on at least two logical channel elements.

With reference to the method described in any one of the second aspect to the thirteenth possible implementation manner of the second aspect, in a fourteenth possible implementation manner of the second aspect, the first identifier information of the first logical channel element includes a logical channel (LCH) ID or a logical channel group (LCG) ID; and the second identifier information of the second logical channel element includes a logical channel (LCH) ID or a logical channel group (LCG) ID.

According to a third aspect, an embodiment of the present invention provides user equipment, including:

a receiving module, configured to receive scheduling signaling sent by a base station, where the scheduling signaling includes a hybrid automatic repeat request (HARQ) process ID; and a processing module, configured to transmit, within a same transmission time interval (TTI), on a process that corresponds to the HARQ process ID, data on a first logical channel element and data on a second logical channel element.

In a first possible implementation manner of the third aspect, the receiving module is specifically configured to receive, within the same TTI, first scheduling signaling and second scheduling signaling that are sent by the base station, where the first scheduling signaling and the second scheduling signaling respectively include a first HARQ process ID and a second HARQ process ID; and correspondingly, the processing module is specifically configured to:

respectively transmit, within the same TTI, on processes that correspond to the first HARQ process ID and the second HARQ process ID, the data on the first logical channel element and the data on the second logical channel element.

With reference to the first possible implementation manner of the third aspect, in a second possible implementation manner of the third aspect, the receiving module is further configured to receive a configuration message sent by the base station, where the configuration message is used to indicate a correspondence between the first HARQ process ID and the first logical channel element, and a correspondence between the second HARQ process ID and the second logical channel element; and correspondingly, the processing module is specifically configured to:

determine, according to the configuration message, the first logical channel element and the second logical channel element that respectively correspond to the first HARQ process ID and the second HARQ process ID; and respectively transmit, on the processes that respectively correspond to the first HARQ process ID and the second HARQ process ID, the data on the first logical channel element and the data on the second logical channel element.

With reference to the third aspect, in a third possible implementation manner of the third aspect, the receiving module is specifically configured to receive third scheduling signaling, where the third scheduling signaling includes a third HARQ process ID; and correspondingly, the processing module is specifically configured to:

transmit, within the same TTI, on a process that corresponds to the third HARQ process ID, the data on the first logical channel element and the data on the second logical channel element.

With reference to the third possible implementation manner of the third aspect, in a fourth possible implementation manner of the third aspect, the receiving module is further configured to receive a configuration message sent by the base station, where the configuration message is used to indicate a correspondence between the third HARQ process ID and the first logical channel element and the second logical channel element; and correspondingly, the processing module is specifically configured to:

determine, according to the configuration message, the first logical channel element and the second logical channel element that correspond to the third HARQ process ID; and transmit, on the process that corresponds to the third HARQ process ID, the data on the first logical channel element and the data on the second logical channel element.

With reference to the third aspect, in a fifth possible implementation manner of the third aspect, the receiving module is specifically configured to receive fourth scheduling signaling, where the fourth scheduling signaling includes a fourth HARQ process ID and a fifth HARQ process ID; and correspondingly, the processing module is specifically configured to:

respectively transmit, within the same TTI, on processes that correspond to the fourth HARQ process ID and the fifth HARQ process ID, the data on the first logical channel element and the data on the second logical channel element.

With reference to the fifth possible implementation manner of the third aspect, in a sixth possible implementation manner of the third aspect, the receiving module is further configured to receive a configuration message sent by the base station, where the configuration message is used to indicate a correspondence between the fourth HARQ process ID and the first logical channel element, and a correspondence between the fifth HARQ process ID and the second logical channel element; and correspondingly, the processing module is specifically configured to:

determine, according to the configuration message, the first logical channel element and the second logical channel element that respectively correspond to the fourth HARQ process ID and the fifth HARQ process ID; and respectively transmit, on the processes that respectively correspond to the fourth HARQ process ID and the fifth HARQ process ID, the data on the first logical channel element and the data on the second logical channel element.

According to a fourth aspect, an embodiment of the present invention provides a base station, including:

a generation module, configured to generate scheduling signaling, where the scheduling signaling includes a hybrid automatic repeat request (HARQ) process ID; and a sending module, configured to send the scheduling signaling to user equipment (UE), to instruct the UE to transmit, within a same transmission time interval (TTI), on a process that corresponds to the HARQ process ID, data on a first logical channel element and data on a second logical channel element.

In a first possible implementation manner of the fourth aspect, the scheduling signaling includes first scheduling signaling and second scheduling signaling, and the first scheduling signaling and the second scheduling signaling respectively include a first HARQ process ID and a second HARQ process ID; and correspondingly, the sending module is further configured to send, within the same TTI, the first scheduling signaling and the second scheduling signaling to the UE.

With reference to the first possible implementation manner of the fourth aspect, in a second possible implementation manner of the fourth aspect, the sending module is further configured to:

send a configuration message to the UE, where the configuration message is used to indicate a correspondence between the first HARQ process ID and the first logical channel element, and a correspondence between the second HARQ process ID and the second logical channel element.

With reference to the fourth aspect, in a third possible implementation manner of the fourth aspect, the scheduling signaling includes third scheduling signaling, and the third scheduling signaling includes a third HARQ process ID.

With reference to the third possible implementation manner of the fourth aspect, in a fourth possible implementation manner of the fourth aspect, the sending module is further configured to:

send a configuration message to the UE, where the configuration message is used to indicate a correspondence between the third HARQ process ID and the first logical channel element and the second logical channel element.

With reference to the fourth aspect, in a fifth possible implementation manner of the fourth aspect, the scheduling signaling includes fourth scheduling signaling, and the fourth scheduling signaling includes a fourth HARQ process ID and a fifth HARQ process ID.

With reference to the fifth possible implementation manner of the fourth aspect, in a sixth possible implementation manner of the fourth aspect, the sending module is further configured to:

send a configuration message to the UE, where the configuration message is used to indicate a correspondence between the fourth HARQ process ID and the first logical channel element, and a correspondence between the fifth HARQ process ID and the second logical channel element.

According to a fifth aspect, an embodiment of the present invention provides a communications system, including the user equipment described in any one of the third aspect to the sixth possible implementation manner of the third aspect, and the base station described in any one of the fourth aspect to the sixth possible implementation manner of the fourth aspect.

According to the processing method for data transmission, the apparatus, and the system provided in the embodiments of the present invention, UE receives scheduling signaling sent by a base station, where the scheduling signaling includes an HARQ process ID; and transmits, within a same TTI, on a process that corresponds to the HARQ process ID, data on a first logical channel element and data on a second logical channel element. In this way, the UE can simultaneously transmit multiple sets of data within a same TTI, which improves utilization of bandwidth resources for data transmission, and therefore effectively ensures data throughput of the UE.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
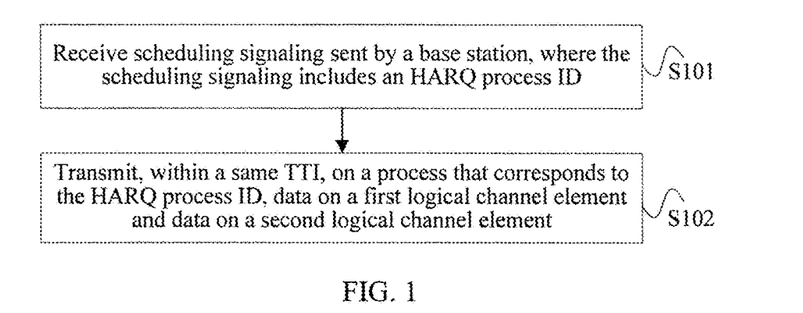
FIG. 1 is a flowchart of Embodiment 1 of a processing method for data transmission according to the present invention.

FIG. 1 is a flowchart of Embodiment 1 of a processing method for data transmission according to the present invention. By way of example, this embodiment is executed by UE. As shown in FIG. 1, the method in this embodiment may include:

S101: Receive scheduling signaling sent by a base station, where the scheduling signaling includes an HARQ process ID.

The scheduling signaling may further include a physical resource used for scheduling data, where the physical resource may be a time-frequency resource. Each piece of scheduling signaling may further carry information such as a modulation and coding scheme and a redundancy version that are used by the UE to receive downlink data or send uplink data. The UE receives the downlink data or sends the uplink data, on a corresponding HARQ process according to the physical resource and the information such as the modulation and coding scheme and the redundancy version in the scheduling signaling.

S102: Transmit, within a same TTI, on a process that corresponds to the HARQ process ID, data on a first logical channel element and data on a second logical channel element.

It should be noted that, the transmission in step S102 includes uplink sending or downlink receiving of the data, that is, the method shown in FIG. 1 may be used in an uplink data transmission process, or may be used in a downlink data transmission process. Moreover, the logical channel element above may be a logical channel (LCH), or may be a logical channel group (LCG).

According to the method shown in FIG. 1, UE can simultaneously transmit, within a same TTI, data on at least two logical channel elements (for example, an LCH or an LCG), which improves utilization of bandwidth resources for data transmission, and therefore effectively ensure data throughput of the UE.

There are three implementation manners in this embodiment for different scheduling signaling sent by the base station in step S101:

In a first implementation manner, S101 is specifically:

S101a: The UE receives, within the same TTI, first scheduling signaling and second scheduling signaling that are sent by the base station, where the first scheduling signaling and the second scheduling signaling respectively include a first HARQ process identifier and a second HARQ process identifier.

Correspondingly, S102 is specifically:

S102a: The UE respectively transmits, within the same TTI, on processes that correspond to the first HARQ process identifier and the second HARQ process identifier, the data on the first logical channel element and data on the second logical channel element.

Before the receiving, by the UE, the scheduling signaling sent by the base station, the method may further include:

S103a: Receive a configuration message sent by the base station, where the configuration message is used to indicate a correspondence between the first HARQ process ID and the first logical channel element, and a correspondence between the second HARQ process ID and the second logical channel element. Correspondingly, S102a is specifically: determining, according to the configuration message, the first logical channel element and the second logical channel element that respectively correspond to the first HARQ process ID and the second HARQ process ID, and respectively transmitting, on the processes that respectively correspond to the first HARQ process ID and the second HARQ process ID, the data on the first logical channel element and the data on the second logical channel element. Specifically, within the same TTI, the data on the first logical channel element and the data on the second logical channel element is simultaneously downloaded or uploaded by using the physical resource, on the processes that respectively correspond to the first HARQ process ID and the second HARQ process ID.

The configuration message includes: first identifier information of the first logical channel element; second identifier information of the second logical channel element; the first HARQ process ID, corresponding to the first identifier information; and the second HARQ process ID, corresponding to the second identifier information.

In the foregoing embodiment, the first HARQ process ID may be the same as or different from the second HARQ process ID. When the first HARQ process ID is the same as the second HARQ process ID, the data on the first logical channel element and the data on the second logical channel element may be multiplexed into one MAC PDU for transmission. When the data on the first logical channel element and the data on the second logical channel element are multiplexed into one MAC PDU, a header of the MAC PDU indicates the data that is from the corresponding different logical channel elements, so that after receiving the MAC PDU, a receiving end transmits the data to the corresponding logical channel elements according to the indication in the header of the MAC PDU. In this way, utilization of bandwidth resources can also be improved.

The configuration message may be sent by using a downlink radio resource control (RRC for short below) message such as an RRC connection setup message or an RRC connection reconfiguration message. Optionally, after receiving the configuration message, the UE needs to feed back a configuration complete message to the base station. Specifically, when the configuration message is an RRC Connection Setup message, the UE sends an RRC connection setup complete message to the base station; or when the configuration message is an RRC Connection reconfiguration message, the UE sends an RRC connection reconfiguration complete message to the base station; or when the configuration message is another downlink RRC message, the UE correspondingly sends a complete message to the base station, which is not limited in this embodiment.

In a second implementation manner, S101 is specifically:

S101b: Receive third scheduling signaling, where the third scheduling signaling includes a third HARQ process ID.

Correspondingly, S102 is specifically:

S102b: Transmit, within the same TTI, on a process that corresponds to the third HARQ process ID, the data on the first logical channel element and the data on the second logical channel element.

Before the receiving, by the UE, the scheduling signaling sent by the base station, the method may further include:

S103b: Receive a configuration message sent by the base station, where the configuration message is used to indicate a correspondence between the third HARQ process ID and the first logical channel element and the second logical channel element. Correspondingly, step S102b is specifically: determining, according to the configuration message, the first logical channel element and the second logical channel element that correspond to the third HARQ process ID, and transmitting, on the process that corresponds to the third HARQ process ID, the data on the first logical channel element and the data on the second logical channel element.

The configuration message includes: first identifier information of the first logical channel element; second identifier information of the second logical channel element; and the third HARQ process ID, corresponding to the first identifier information and the second identifier information.

In a third implementation manner, S101 is specifically:

S101c: Receive fourth scheduling signaling, where the fourth scheduling signaling includes a fourth HARQ process ID and a fifth HARQ process ID.

Correspondingly, S102 is specifically:

S102c: Respectively transmit, within the same TTI, on processes that correspond to the fourth HARQ process ID and the fifth HARQ process ID, the data on the first logical channel element and the data on the second logical channel element.

Before the receiving, by the UE, the scheduling signaling sent by the base station, the method may further include:

S103c: Receive a configuration message sent by the base station, where the configuration message is used to indicate a correspondence between the fourth HARQ process ID and the first logical channel element, and a correspondence between the fifth HARQ process ID and the second logical channel element. Correspondingly, S102c is specifically: determining, according to the configuration message, the first logical channel element and the second logical channel element that respectively correspond to the fourth HARQ process ID and the fifth HARQ process ID; and respectively transmitting, on the processes that respectively correspond to the fourth HARQ process ID and the fifth HARQ process ID, the data on the first logical channel element and the data on the second logical channel element.

The configuration message includes: first identifier information of the first logical channel element; second identifier information of the second logical channel element; the fourth HARQ process ID, corresponding to the first identifier information; and the fifth HARQ process ID, corresponding to the second identifier information.

The fourth HARQ process ID is the same as or different from the fifth HARQ process ID. When the fourth HARQ process ID is the same as the fifth HARQ process ID, the data on the first logical channel element and the data on the second logical channel element may be multiplexed into one MAC PDU for transmission. When the data on the first logical channel element and the data on the second logical channel element are multiplexed into one MAC PDU, a header of the MAC PDU indicates the data that is from the corresponding different logical channel elements, so that after receiving the MAC PDU, a receiving end transmits the data to the corresponding logical channel elements according to the indication in the header of the MAC PDU. In this way, utilization of bandwidth resources can also be improved.

In the foregoing embodiment, the configuration message further includes:

a maximum quantity of times of HARQ transmission or retransmission of the first logical channel element; and a maximum quantity of times of HARQ transmission or retransmission of the second logical channel element. Herein, the maximum quantity of times of HARQ transmission or retransmission of the first logical channel element may be the same as the maximum quantity of times of HARQ transmission or retransmission of the second logical channel element, and when they are the same, they may be only one information element.

In the foregoing embodiment, before the receiving, by the UE, the scheduling signaling sent by the base station, the method may further include:

S104: Receive indication information sent by the base station, where the indication information is used to instruct to transmit, within the same TTI, data on at least two logical channel elements.

In the foregoing embodiment, the first identifier information of the first logical channel element includes an LCH ID or a logical channel group (LCG for short below) ID, and the second identifier information of the second logical channel element includes an LCH ID or an LCG ID, where one LCG includes at least one LCH.

It should be noted herein that, scheduling of two sets of data is described in this embodiment as an example, scheduling of multiple sets of data can be implemented by using a similar method, and UE may simultaneously transmit multiple sets of data within a same TTI, and details are not described herein again.

According to the processing method for data transmission provided in this embodiment, UE receives scheduling signaling sent by a base station, where the scheduling signaling includes an HARQ process ID; and transmits, within a same TTI, on a process that corresponds to the HARQ process ID, data on a first logical channel element and data on a second logical channel element. In this way, the UE can simultaneously transmit multiple sets of data within a same TTI, which improves utilization of bandwidth resources for data transmission, and therefore effectively ensures data throughput of the UE.

Figure 2:
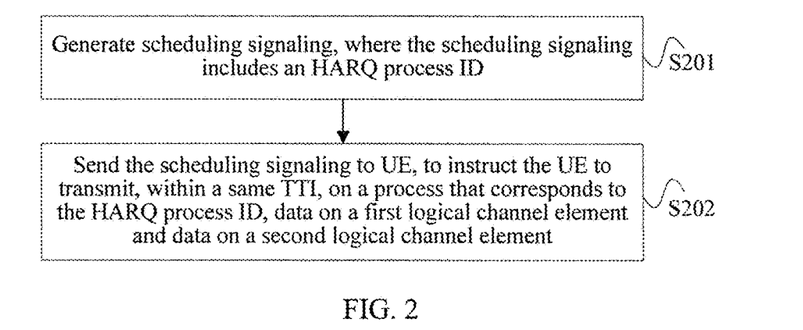
FIG. 2 is a flowchart of Embodiment 2 of a processing method for data transmission according to the present invention.

FIG. 2 is a flowchart of Embodiment 2 of a processing method for data transmission according to the present invention. As shown in FIG. 2, by way of example, this embodiment is executed by a base station, and the method in this embodiment may include:

S201: Generate scheduling signaling, where the scheduling signaling includes an HARQ process ID.

The scheduling signaling further includes a physical resource used for scheduling data, where the physical resource may be a time-frequency resource. Each piece of scheduling signaling may further carry information such as a modulation and coding scheme and a redundancy version that are used by UE to receive downlink data or send uplink data. The UE receives the downlink data or sends the uplink data, on a corresponding HARQ process according to the physical resource and the information such as the modulation and coding scheme and the redundancy version in the scheduling signaling.

S202: Send the scheduling signaling to UE, to instruct the UE to transmit, within a same TTI, on a process that corresponds to the HARQ process ID, data on a first logical channel element and data on a second logical channel element.

In an implementation manner, the scheduling signaling includes first scheduling signaling and second scheduling signaling, and the first scheduling signaling and the second scheduling signaling respectively include a first HARQ process ID and a second HARQ process ID. Correspondingly, S202 in which the scheduling signaling is sent to the user equipment CUE) includes: sending, within the same TTI, the first scheduling signaling and the second scheduling signaling to the UE.

Before the sending, by the base station, the scheduling signaling to the UE, the method may further include:

S203: Send a configuration message to the UE, where the configuration message is used to indicate a correspondence between the first HARQ process ID and the first logical channel element, and a correspondence between the second HARQ process ID and the second logical channel element.

The configuration message includes: first identifier information of the first logical channel element; second identifier information of the second logical channel element; the first HARQ process ID, corresponding to the first identifier information; and the second HARQ process ID, corresponding to the second identifier information.

The first HARQ process ID may be the same as or different from the second HARQ process ID. When the first HARQ process ID is the same as the second HARQ process ID, the data on the first logical channel element and the data on the second logical channel element may be multiplexed into one MAC PDU for transmission. When the data on the first logical channel element and the data on the second logical channel element are multiplexed into one MAC PDU, a header of the MAC PDU indicates the data that is from the corresponding different logical channel elements, so that after receiving the MAC PDU, a receiving end transmits the data to the corresponding logical channel elements according to the indication in the header of the MAC PDU. In this way, utilization of bandwidth resources can also be improved.

In another implementation manner, the scheduling signaling includes third scheduling signaling, and the third scheduling signaling includes a third HARQ process ID.

Before the sending, by the base station, the scheduling signaling to the UE, the method may further include:

sending a configuration message to the UE, where the configuration message is used to indicate a correspondence between the third HARQ process ID and the first logical channel element and the second logical channel element.

The configuration message includes: first identifier information of the first logical channel element; second identifier information of the second logical channel element; and the third HARQ process ID, corresponding to the first identifier information and the second identifier information.

In still another implementation manner, the scheduling signaling includes fourth scheduling signaling, and the fourth scheduling signaling includes a fourth HARQ process ID and a fifth HARQ process ID.

Before the sending, by the base station, the scheduling signaling to the UE, the method may further include:

sending a configuration message to the UE, where the configuration message is used to indicate a correspondence between the fourth HARQ process ID and the first logical channel element, and a correspondence between the fifth HARQ process ID and the second logical channel element.

The configuration message includes: first identifier information of the first logical channel element; second identifier information of the second logical channel element; the fourth HARQ process ID, corresponding to the first identifier information; and the fifth HARQ process ID, corresponding to the second identifier information.

The fourth HARQ process ID is the same as or different from the fifth HARQ process ID. When the fourth HARQ process ID is the same as the fifth HARQ process ID, the data on the first logical channel element and the data on the second logical channel element may be multiplexed into one MAC PDU for transmission. When the data on the first logical channel element and the data on the second logical channel element are multiplexed into one MAC PDU, a header of the MAC PDU indicates the data that is from the corresponding different logical channel elements, so that after receiving the MAC PDU, a receiving end transmits the data to the corresponding logical channel elements according to the indication in the header of the MAC PDU. In this way, utilization of bandwidth resources can also be improved.

In the foregoing embodiment, the configuration message may further include: a maximum quantity of times of HARQ transmission or retransmission of the first logical channel element; and a maximum quantity of times of HARQ transmission or retransmission of the second logical channel element. Herein, the maximum quantity of times of HARQ transmission or retransmission of the first logical channel element may be the same as the maximum quantity of times of HARQ transmission or retransmission of the second logical channel element, and when they are the same, they may be only one information element.

In the foregoing embodiment, before the sending the scheduling signaling to user equipment (UE), the method further includes:

S204: Send indication information to the UE, where the indication information is used to instruct the UE to transmit, within the same TTI, data on at least two logical channel elements.

Further, the first identifier information of the first logical channel element includes an LCH ID or an LCG ID, and the second identifier information of the second logical channel element includes an LCH ID or an LCG ID, where one LCG includes at least one LCH.

It should be noted herein that, scheduling of two sets of data is described in this embodiment as an example, scheduling of multiple sets of data can be implemented by using a similar method, and UE may simultaneously transmit multiple sets of data within a same TTI, and details are not described herein again.

According to the processing method for data transmission provided in this embodiment, a base station generates scheduling signaling, where the scheduling signaling includes an HARQ process ID; and then sends the scheduling signaling to UE, to instruct the UE to transmit, within a same TTI, on a process that corresponds to the HARQ process ID, data on a first logical channel element and data on a second logical channel element. In this way, the UE can simultaneously transmit multiple sets of data within a same TTI, which improves utilization of bandwidth resources for data transmission, and therefore effectively ensures data throughput of the UE.

The technical solutions in the method embodiments shown above are described in detail below by using a specific embodiment.

Figure 3:
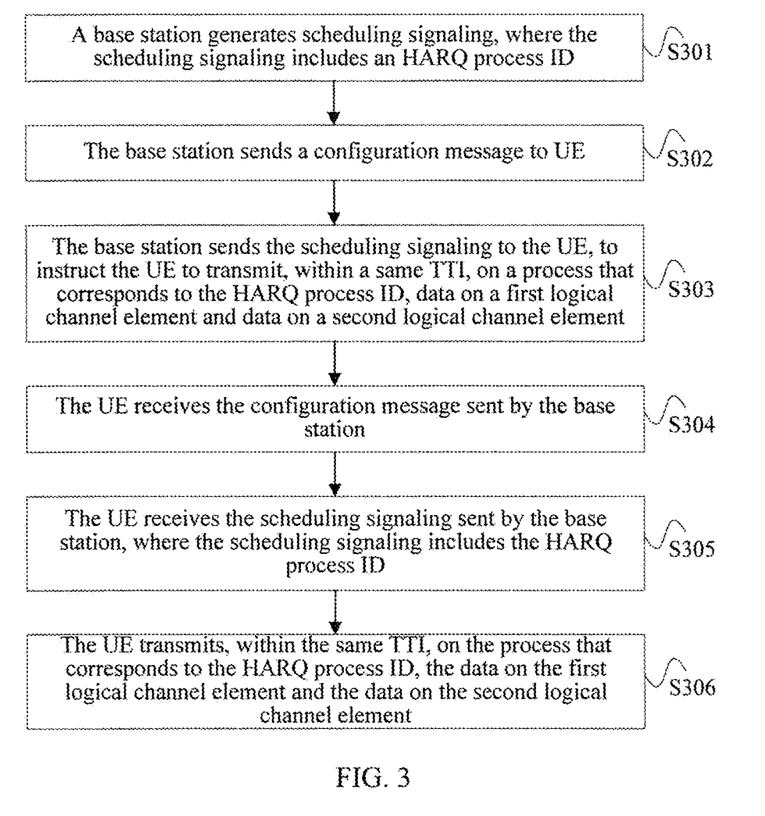
FIG. 3 is a flowchart of Embodiment 3 of a processing method for data transmission according to the present invention.

FIG. 3 is a flowchart of Embodiment 3 of a processing method for data transmission according to the present invention. As shown in FIG. 3, the method in this embodiment includes:

S301: A base station generates scheduling signaling, where the scheduling signaling includes an HARQ process ID.

S302: The base station sends a configuration message to UE.

S303: The base station sends the scheduling signaling to the UE, to instruct the UE to transmit, within a same TTI, on a process that corresponds to the HARQ process ID, data on a first logical channel element and data on a second logical channel element.

S304: The UE receives the configuration message sent by the base station.

S305: The UE receives the scheduling signaling sent by the base station, where the scheduling signaling includes the HARQ process ID.

S306: The UE transmits, within the same TTI, on the process that corresponds to the HARQ process ID, the data on the first logical channel element and the data on the second logical channel element.

Specifically, for three different implementation manners of the scheduling signaling, a process in which the UE transmits, within the same TTI, the data on the first logical channel element and the data on the second logical channel element is described in detail below.

1. The scheduling signaling includes first scheduling signaling and second scheduling signaling, and the first scheduling signaling and the second scheduling signaling respectively include an HARQ 1 and an HARQ 2.

The configuration message is used to indicate a correspondence between the HARQ 1 and the first logical channel element, and a correspondence between the HARQ 2 and the second logical channel element. The configuration message includes: first identifier information LCH 1 (or LCG 1) of the first logical channel element, the HARQ 1, and a maximum quantity M of times of HARQ transmission or retransmission of the first logical channel element; and second identifier information LCH 2 (or LCG 2) of the second logical channel element, the HARQ 2, and a maximum quantity N of times of HARQ transmission or retransmission of the second logical channel element, where M may be equal to N.

First, downlink data transmission is used as an example. The UE detects, within a TTI, two pieces of scheduling signaling: first scheduling signaling and second scheduling signaling, where the two pieces of scheduling signaling respectively include an HARQ process 1 and a physical resource, and an HARQ process 2 and a physical resource, which are used for scheduling data. That is, the UE is instructed to receive two downlink data packets by using the HARQ process 1 and the HARQ process 2. The UE decodes the two received downlink data packets by using the corresponding HARQ processes according to the indication, and feeds back decoding information of the downlink data to the base station. There are two implementation manners for the UE to feedback the decoding information of the downlink data to the base station:

(1) The UE acquires an uplink feedback resource according to a start location of a resource occupied by one piece of scheduling signaling, and sends, on the uplink feedback resource, the decoding information of the two sets of downlink data to the base station. The decoding information of each piece of downlink data occupies one bit, and in this case, the configuration message further includes indication information, where the indication information is used to instruct the UE to feedback the decoding information by sending the decoding information according to an order of HARQ process IDs, for example, in descending or ascending order of HARQ process IDs. After receiving the indication information in the configuration message, the UE sends, on the uplink feedback resource, the decoding information of the two sets of downlink data to the base station according to the order of HARQ process IDs.

A start location of a resource occupied by one piece of scheduling signaling may be: a start location of a resource occupied by the scheduling signaling that occupies a resource with a lower start location in the two pieces of scheduling signaling, or a start location of a resource occupied by the scheduling signaling that occupies a resource with a higher start location in the two pieces of scheduling signaling, or a start location of a resource occupied by scheduling signaling that is pre-configured in the configuration message.

(2) The UE separately acquires a corresponding uplink feedback resource according to the start location of the resource occupied by each piece of scheduling signaling, and respectively sends, on the uplink feedback resources, the decoding information of the two sets of downlink data to the base station.

After the base station receives the decoding information, if the fed-back decoding information is a negative acknowledgment (NACK for short), the base station retransmits the downlink data packet to the UE according to a maximum quantity M or N of times of HARQ transmission or retransmission that corresponds to the corresponding HARQ process ID.

Then, uplink data transmission is used as an example. The UE detects, within a TTI, two pieces of scheduling signaling, where the two pieces of scheduling signaling respectively include an HARQ process 1 and a physical resource, and an HARQ process 2 and a physical resource, which are used for scheduling data. That is, the UE is instructed to send two data packets by using the HARQ process 1 and the HARQ process 2. The UE sends the two uplink data packets to the base station by using the corresponding HARQ processes according to the indication. The base station receives the two uplink data packets sent by the UE, and sends decoding information to the UE according to a decoding status. After the UE receives the decoding information of the two pieces of uplink data, if the fed-back decoding information is an NACK, the UE retransmits the uplink data packet to the base station according to a maximum quantity M or N of times of HARQ transmission or retransmission that corresponds to the corresponding HARQ process ID. The base station receives the two uplink data packets sent by the UE, and sends the decoding information to the UE according to the decoding status. There are two implementation manners for the base station to feed back the decoding information of the uplink data to the UE.

(1) The base station acquires a downlink feedback resource according to a start location of a resource occupied by one piece of uplink data, and sends, on the downlink feedback resource, the decoding information of the two sets of uplink data to the UE. Specifically, the base station may send the decoding information of the two sets of uplink data to the UE according to an order of HARQ process IDs, and correspondingly, the configuration message further includes indication information, where the indication information is used to indicate to the UE that the decoding information fed back by the base station is sent according to the order of HARQ process IDs. In this way, after receiving the decoding information, the UE can know a decoding status of the data of a corresponding HARQ process.

A start location of a resource occupied by one piece of uplink data may be:

a start location of a resource occupied by the uplink data that occupies a resource with a lower start location in the two pieces of uplink data, or a start location of a resource occupied by the uplink data that occupies a resource with a higher start location in the two pieces of uplink data, or a start location of a resource occupied by uplink data that is pre-configured in the configuration message.

(2) The base station calculates, according to the start location of the resource occupied by each piece of uplink data, a feedback resource used for feeding back the piece of uplink data.

After the UE receives the decoding information of each piece of uplink data, if the fed-back decoding information is an NACK, the UE retransmits the uplink data packet to the base station according to a maximum quantity M or N of times of HARQ transmission or retransmission that corresponds to the corresponding HARQ process ID. The HARQ retransmission executed by the UE may be synchronous non-adaptive retransmission, or adaptive retransmission, which is not limited in this embodiment.

2. The scheduling signaling includes third scheduling signaling, and the third scheduling signaling includes an HARQ 3.

The configuration message is used to indicate a correspondence between the HARQ 3 and the first logical channel element and the second logical channel element. The configuration message includes: first identifier information LCH 1 (or LCG 1) of the first logical channel element; second identifier information LCH 2 (or LCG 2) of the second logical channel element; the HARQ 3, where the HARQ 3 corresponds to the LCH 1 (or LCG 1) and the LCH 2 (or LCG 2); and a maximum quantity M of times of HARQ transmission or retransmission of the first logical channel element, and a maximum quantity N of times of HARQ transmission or retransmission of the second logical channel element, where M may be equal to N.

First, downlink data transmission is used as an example. The UE detects, within a TTI, third scheduling signaling, where the third scheduling signaling includes the HARQ 3 and a physical resource that are used for scheduling data. That is, the UE is instructed to receive two downlink data packets by using the HARQ 3. The UE decodes the two received downlink data packets by using the corresponding HARQ processes according to the indication, and feeds back decoding information of the downlink data to the base station. That the UE feeds back the decoding information of the downlink data to the base station is specifically: acquiring, by the UE, an uplink feedback resource according to a start location of a resource occupied by the third scheduling signaling, and sending, on the uplink feedback resource, the decoding information of the two sets of downlink data to the base station. The decoding information of each piece of downlink data occupies one bit.

After the base station receives the decoding information, if the fed-back decoding information is an NACK, the base station retransmits the downlink data packet to the UE according to a maximum quantity M or N of times of HARQ transmission or retransmission that corresponds to the corresponding HARQ process ID.

Then, uplink data transmission is used as an example. The UE detects, within a TTI, third scheduling signaling, where the third scheduling signaling includes the HARQ 3 and a physical resource that are used for scheduling data. That is, the UE is instructed to send two data packets by using the HARQ 3. The UE sends the two uplink data packets to the base station by using the corresponding HARQ 3 according to the indication. The base station receives the two uplink packets sent by the UE, and sends decoding information to the UE according to a decoding status. There are two implementation manners for the base station to feed back the decoding information of the uplink data to the UE:

(1) The base station acquires a downlink feedback resource according to a start location of a resource occupied by one piece of uplink data, and sends, on the downlink feedback resource, the decoding information of the two sets of uplink data to the UE. Specifically, the base station may send the decoding information of the two sets of uplink data to the UE according to an order of HARQ process IDs, and correspondingly, the configuration message further includes indication information, where the indication information is used to indicate to the UE that the decoding information fed back by the base station is sent according to the order of HARQ process IDs. In this way, after receiving the decoding information, the UE can know a decoding status of the data of a corresponding HARQ process.

A start location of a resource occupied by one piece of uplink data may be:

a start location of a resource occupied by the uplink data that occupies a resource with a lower start location in the two pieces of uplink data, or a start location of a resource occupied by the uplink data that occupies a resource with a higher start location in the two pieces of uplink data, or a start location of a resource occupied by uplink data that is pre-configured in the configuration message.

(2) The base station calculates, according to the start location of the resource occupied by each piece of uplink data, a feedback resource used for feeding back the piece of uplink data.

After the UE receives the decoding information of each piece of uplink data, if the fed-back decoding information is an NACK, the UE retransmits the uplink data packet to the base station according to a maximum quantity M or N of times of HARQ transmission or retransmission that corresponds to the corresponding HARQ process ID. The HARQ retransmission executed by the UE may be synchronous non-adaptive retransmission, or adaptive retransmission, which is not limited in this embodiment.

3. The scheduling signaling includes fourth scheduling signaling, and the fourth scheduling signaling includes a fourth HARQ process ID and a fifth HARQ process ID.

The configuration message is used to indicate a correspondence between the fourth HARQ process ID and the first logical channel element, and a correspondence between the fifth HARQ process ID and the second logical channel element.

The configuration message includes: first identifier information LCH 1 (or LCG 1) of the first logical channel element; second identifier information LCH 2 (or LCG 2) of the second logical channel element; an HARQ 4, corresponding to the first identifier information; an HARQ 5, corresponding to the second identifier information; and a maximum quantity M of times of HARQ transmission or retransmission of the first logical channel element, and a maximum quantity N of times of HARQ transmission or retransmission of the second logical channel element, where M may be equal to N.

First, downlink data transmission is used as an example. The UE detects, within a TTI, fourth scheduling signaling, where the fourth scheduling signaling includes an HARQ 3 and a physical resource, and an HARQ 4 and a physical resource, which are used for scheduling data. That is, the UE is instructed to respectively receive two downlink data packets by using the HARQ 3 and the HARQ 4. The UE decodes the two received downlink data packets by using the corresponding HARQ processes according to the indication, and feeds back decoding information of the downlink data to the base station. That the UE feeds back the decoding information of the downlink data to the base station is specifically: acquiring, by the UE, an uplink feedback resource according to a start location of a resource occupied by the fourth scheduling signaling, and sending, on the uplink feedback resource, the decoding information of the two sets of downlink data to the base station. The decoding information of each piece of downlink data occupies one bit.

In this case, the configuration message further includes indication information, where the indication information is used to instruct the UE to feed back the decoding information by sending the decoding information according to an order of HARQ process IDs, for example, in descending or ascending order of HARQ process IDs. In this case, that the UE feeds back the decoding information of the downlink data to the base station is specifically: acquiring an uplink feedback resource according to a start location of a resource occupied by one piece of scheduling signaling, and sends, on the uplink feedback resource, the decoding information of the two sets of downlink data to the base station according to the order of HARQ process IDs.

After the base station receives the decoding information, if the fed-back decoding information is an NACK, the base station retransmits the downlink data packet to the UE according to a maximum quantity M or N of times of HARQ transmission or retransmission that corresponds to the corresponding HARQ process ID.

Then, uplink data transmission is used as an example. The UE detects, within a TTI, fourth scheduling signaling, where the fourth scheduling signaling includes an HARQ 3 and a physical resource, and an HARQ 4 and a physical resource, which are used for scheduling data. That is, the UE is instructed to send two data packets by using the HARQ 3 and the HARQ 4. The UE sends the two uplink data packets to the base station by using the corresponding HARQ processes according to the indication. The base station receives the two uplink packets sent by the UE, and sends decoding information to the UE according to a decoding status. There are two implementation manners for the base station to feed back the decoding information of the uplink data to the UE:

(1) The base station acquires a downlink feedback resource according to a start location of a resource occupied by one piece of uplink data, and sends, on the downlink feedback resource, the decoding information of the two sets of uplink data to the UE. Specifically, the base station may send the decoding information of the two sets of uplink data to the UE according to an order of HARQ process IDs, and correspondingly, the configuration message further includes indication information, where the indication information is used to indicate to the UE that the fed-back decoding information by the base station is sent according to the order of HARQ process IDs. In this way, after receiving the decoding information, the UE can know a decoding status of the data of a corresponding HARQ process.

A start location of a resource occupied by one piece of uplink data may be:

a start location of a resource occupied by the uplink data that occupies a resource with a lower start location in the two pieces of uplink data, or a start location of a resource occupied by the uplink data that occupies a resource with a higher start location in the two pieces of uplink data, or a start location of a resource occupied by uplink data that is pre-configured in the configuration message.

(2) The base station calculates, according to the start location of the resource occupied by each piece of uplink data, a feedback resource used for feeding back the piece of uplink data.

After the UE receives the decoding information of each piece of uplink data, if the fed-back decoding information is an NACK, the UE retransmits the uplink data packet to the base station according to a maximum quantity M or N of times of HARQ transmission or retransmission that corresponds to the corresponding HARQ process ID. The HARQ retransmission executed by the UE may be synchronous non-adaptive retransmission, or adaptive retransmission, which is not limited in this embodiment.

It should be noted herein that, scheduling of two sets of data is described in this embodiment as an example, scheduling of multiple sets of data can be implemented by using a similar method, and UE may simultaneously transmit multiple sets of data within a same TTI, and details are not described herein again.

Figure 4:
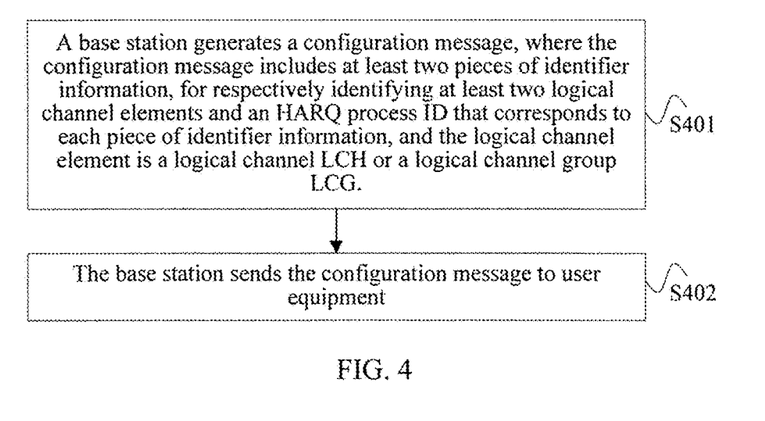
FIG. 4 is a flowchart of Embodiment 4 of a processing method for data transmission according to the present invention.

FIG. 4 is a flowchart of Embodiment 4 of a processing method for data transmission according to the present invention. As shown in FIG. 4, the method in this embodiment includes:

S401: A base station generates a configuration message, where the configuration message includes at least two pieces of identifier information, for respectively identifying at least two logical channel elements and an HARQ process ID that corresponds to each piece of identifier information, and the logical channel element is a logical channel (LCH) or a logical channel group (LCG). The HARQ process IDs corresponding to these pieces of identifier information may be the same or may be different.

S402: The base station sends the configuration message to user equipment.

Further, the method in this embodiment further includes:

S403: When data on a first logical channel element and a second logical channel element needs to be scheduled, determine, according to the configuration message, HARQ process IDs that correspond to identifier information of the first logical channel element and the second logical channel element, where the first logical channel element and the second logical channel element respectively correspond to different HARQ process IDs, or the first logical channel element and the second logical channel element correspond to a same HARQ process ID.

S404: Send scheduling signaling to the user equipment, where the scheduling signaling includes the determined HARQ process IDs.

Further, there are two implementation manners for sending scheduling signaling to the user equipment:

In one implementation manner, one piece of scheduling signaling is sent to the user equipment, where the scheduling signaling includes the determined same or different HARQ process IDs.

In the other implementation manner, different pieces of scheduling signaling are sent within a same TTI, where the pieces of scheduling signaling all include the determined same HARQ process ID, or respectively include the determined different HARQ process IDs.

In the foregoing embodiment, the configuration message further includes:

a maximum quantity of times of HARQ transmission or retransmission that corresponds to each piece of identifier information.

According to the processing method for data transmission provided in this embodiment, a base station generates a configuration message, where the configuration message includes at least two pieces of identifier information, for respectively identifying at least two logical channel elements and an HARQ process ID that corresponds to each piece of identifier information, and the logical channel element is an LCH or an LCG; and then, the base station sends the configuration message to user equipment. In this way, the UE can simultaneously transmit, within a same TTI, multiple sets of data according to the received configuration message, which improves utilization of bandwidth resources for data transmission, and therefore effectively ensures data throughput of the UE.

Figure 5:
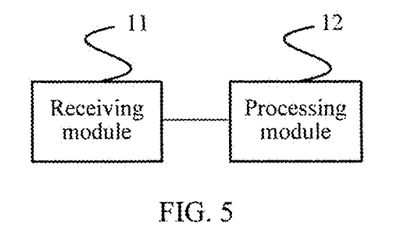
FIG. 5 is a schematic structural diagram of Embodiment 1 of user equipment according to the present invention.

FIG. 5 is a schematic structural diagram of Embodiment 1 of user equipment according to the present invention. As shown in FIG. 5, the user equipment in this embodiment may include a receiving module 11 and a processing module 12, where the receiving module 11 is configured to receive scheduling signaling sent by a base station, where the scheduling signaling includes a hybrid automatic repeat request (HARQ) process ID; and the processing module 12 is configured to transmit, within a same transmission time interval (TTI), on a process that corresponds to the HARQ process ID, data on a first logical channel element and data on a second logical channel element.

Further, the receiving module 11 is specifically configured to receive, within a same TTI, first scheduling signaling and second scheduling signaling that are sent by the base station, where the first scheduling signaling and the second scheduling signaling respectively include a first HARQ process ID and a second HARQ process ID; and correspondingly, the processing module 12 is specifically configured to:

respectively transmit, within the same TTI, on processes that correspond to the first HARQ process ID and the second HARQ process ID, the data on the first logical channel element and the data on the second logical channel element.

Specifically, the receiving module 11 is further configured to receive a configuration message sent by the base station, where the configuration message is used to indicate a correspondence between the first HARQ process ID and the first logical channel element, and a correspondence between the second HARQ process ID and the second logical channel element; and correspondingly, the processing module 12 is specifically configured to:

determine, according to the configuration message, the first logical channel element and the second logical channel element that respectively correspond to the first HARQ process ID and the second HARQ process ID; and respectively transmit, on the processes that respectively correspond to the first HARQ process ID and the second HARQ process ID, the data on the first logical channel element and the data on the second logical channel element.

Further, the receiving module 11 is specifically configured to receive third scheduling signaling, where the third scheduling signaling includes a third HARQ process ID; and correspondingly, the processing module 12 is specifically configured to:

transmit, within the same TTI, on a process that corresponds to the third HARQ process ID, the data on the first logical channel element and the data on the second logical channel element.

Specifically, the receiving module 11 is further configured to receive a configuration message sent by the base station, where the configuration message is used to indicate a correspondence between the third HARQ process ID and the first logical channel element and the second logical channel element; and correspondingly, the processing module 12 is specifically configured to:

determine, according to the configuration message, the first logical channel element and the second logical channel element that correspond to the third HARQ process ID; and transmit, on the process that corresponds to the third HARQ process ID, the data on the first logical channel element and the data on the second logical channel element.

Further, the receiving module 11 is specifically configured to receive fourth scheduling signaling, where the fourth scheduling signaling includes a fourth HARQ process ID and a fifth HARQ process ID; and correspondingly, the processing module 12 is specifically configured to:

respectively transmit, within the same TTI, on processes that correspond to the fourth HARQ process ID and the fifth HARQ process ID, the data on the first logical channel element and the data on the second logical channel element.

Specifically, the receiving module 11 is further configured to receive a configuration message sent by the base station, where the configuration message is used to indicate a correspondence between the fourth HARQ process ID and the first logical channel element, and a correspondence between the fifth HARQ process ID and the second logical channel element; and correspondingly, the processing module 12 is specifically configured to:

determine, according to the configuration message, the first logical channel element and the second logical channel element that respectively correspond to the fourth HARQ process ID and the fifth HARQ process ID; and respectively transmit, on the processes that respectively correspond to the fourth HARQ process ID and the fifth HARQ process ID, the data on the first logical channel element and the data on the second logical channel element.

The user equipment in this embodiment may be used to execute the technical solution of the method embodiment shown in FIG. 1, and their implementation principles are similar, which are not described in detail herein again.

According to the user equipment provided in this embodiment, the receiving module receives scheduling signaling sent by a base station, where the scheduling signaling includes an HARQ process ID; and the processing module transmits, within a same TTI, on a process that corresponds to the HARQ process ID, data on a first logical channel element and data on a second logical channel element. In this way, the UE can simultaneously transmit multiple sets of data within a same TTI, which improves utilization of bandwidth resources for data transmission, and therefore effectively ensures data throughput of the UE.

Figure 6:
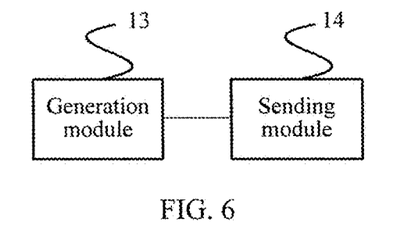
FIG. 6 is a schematic structural diagram of Embodiment 1 of a base station according to the present invention.

FIG. 6 is a schematic structural diagram of Embodiment 1 of a base station according to the present invention. As shown in FIG. 6, the base station in this embodiment may include a generation module 13 and a sending module 14, where the generation module 13 is configured to generate scheduling signaling, where the scheduling signaling includes a hybrid automatic repeat request (HARQ) process ID; and the sending module 14 is configured to send the scheduling signaling to user equipment (UE), to instruct the UE to transmit, within a same transmission time interval (TTI), on a process that corresponds to the HARQ process ID, data on a first logical channel element and data on a second logical channel element.

Further, the scheduling signaling includes first scheduling signaling and second scheduling signaling, and the first scheduling signaling and the second scheduling signaling respectively include a first HARQ process ID and a second HARQ process ID; and correspondingly, the sending module 14 is further configured to send, within a same TTI, the first scheduling signaling and the second scheduling signaling to the UE.

Further, the sending module 14 is further configured to:

send a configuration message to the UE, where the configuration message is used to indicate a correspondence between the first HARQ process ID and the first logical channel element, and a correspondence between the second HARQ process ID and the second logical channel element.

Further, the scheduling signaling includes third scheduling signaling, and the third scheduling signaling includes a third HARQ process ID.

The sending module 14 is further configured to:

send a configuration message to the UE, where the configuration message is used to indicate a correspondence between the third HARQ process ID and the first logical channel element and the second logical channel element.

Further, the scheduling signaling includes fourth scheduling signaling, and the fourth scheduling signaling includes a fourth HARQ process ID and a fifth HARQ process ID.

The sending module 14 is further configured to:

send a configuration message to the UE, where the configuration message is used to indicate a correspondence between the fourth HARQ process ID and the first logical channel element, and a correspondence between the fifth HARQ process ID and the second logical channel element.

The base station in this embodiment may be used to execute the technical solution of the method embodiment shown in FIG. 2, and their implementation principles and technical effects are similar, which are not described in detail herein again.

According to the base station provided in this embodiment, the generation module generates scheduling signaling, where the scheduling signaling includes an HARQ process ID; and then the sending module sends the scheduling signaling to UE, to instruct the UE to transmit, within a same TTI, on a process that corresponds to the HARQ process ID, data on a first logical channel element and data on a second logical channel element. In this way, the UE can simultaneously transmit multiple sets of data within a same TTI, which improves utilization of bandwidth resources for data transmission, and therefore effectively ensures data throughput of the UE.

An embodiment of the present invention provides a communications system, including the user equipment shown in FIG. 5 and the base station shown in FIG. 6.

Figure 7:
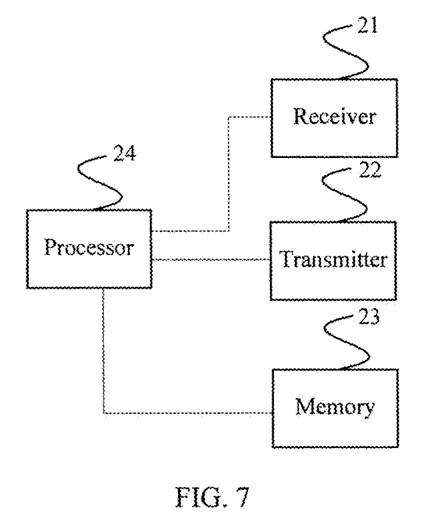
FIG. 7 is a schematic structural diagram of Embodiment 2 of user equipment according to the present invention.

FIG. 7 is a schematic structural diagram of Embodiment 2 of user equipment according to the present invention. As shown in FIG. 7, the user equipment in this embodiment may include: a receiver 21, a transmitter 22, a memory 23, and a processor 24 separately connected to the receiver 21, the transmitter 22, and the memory 23, where the receiver 21 is configured to receive scheduling signaling sent by a base station, where the scheduling signaling includes a hybrid automatic repeat request (HARQ) process ID; and the memory 23 stores a set of program code, and the processor 24 invokes the program code to perform the following operation of:

transmitting, within a same transmission time interval (TTI), on a process that corresponds to the HARQ process ID, data on a first logical channel element and data on a second logical channel element by using the receiver 21 and the transmitter 22.

According to the user equipment provided in this embodiment, the receiver receives scheduling signaling sent by a base station, where the scheduling signaling includes an HARQ process ID; and the processor invokes the program code stored in the memory to transmit, within a same TTI, on a process that corresponds to the HARQ process ID, data on a first logical channel element and data on a second logical channel element by using the receiver and the transmitter. In this way, the UE can simultaneously transmit multiple sets of data within a same TTI, which improves utilization of bandwidth resources for data transmission, and therefore effectively ensures data throughput of the UE.

Figure 8:
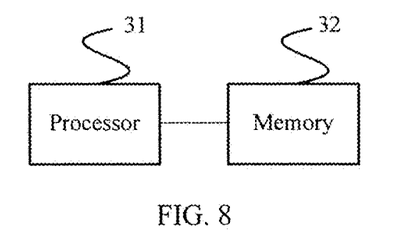
FIG. 8 is a schematic structural diagram of Embodiment 2 of a base station according to the present invention.

FIG. 8 is a schematic structural diagram of Embodiment 2 of a base station according to the present invention. As shown in FIG. 8, the base station in this embodiment may include a processor 31 and a memory 32 connected to each other, where the processor 31 is configured to generate scheduling signaling, where the scheduling signaling includes a hybrid automatic repeat request (HARQ) process ID; and send the scheduling signaling to user equipment (UE), to instruct the UE to transmit, within a same transmission time interval (TTI), on a process that corresponds to the HARQ process ID, data on a first logical channel element and data on a second logical channel element; and the memory 32 is configured to store the scheduling signaling.

According to the base station provided in this embodiment, the processor generates scheduling signaling, where the scheduling signaling includes an HARQ process ID; and sends the scheduling signaling to UE, to instruct the UE to transmit, within a same TTI, on a process that corresponds to the HARQ process ID, data on a first logical channel element and data on a second logical channel element. In this way, the UE can simultaneously transmit multiple sets of data within a same TTI, which improves utilization of bandwidth resources for data transmission, and therefore effectively ensures data throughput of the UE.

An embodiment of the present invention provides a communications system, including the user equipment shown in FIG. 7 and the base station shown in FIG. 8.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A processing method for data transmission, the method comprising:
   receiving, by user equipment (UE), a configuration message sent by a base station, wherein the configuration message is used to indicate a correspondence between a hybrid automatic repeat request (HARQ) process ID and a logical channel element, wherein the logical channel element comprises a first logical channel element and a second logical channel element, and the first logical channel element and the second logical channel element corresponds to a same HARQ process ID or different HARQ process IDs;
   receiving, by the UE, scheduling signaling sent by the base station, wherein the scheduling signaling comprises the HARQ process ID; and
   transmitting, by the UE within a same transmission time interval (TTI), on a process corresponding to the HARQ process ID, data on the first logical channel element and data on the second logical channel element.

2. The method according to claim 1, wherein:
   the scheduling signaling comprises first scheduling signaling and second scheduling signaling, the first scheduling signaling comprises a first HARQ process ID, the second scheduling signaling comprises a second HARQ process ID, and the HARQ process ID comprises the first HARQ process ID and the second HARQ process ID; and
   transmitting the data on the first logical channel element and the data on the second logical channel element comprises:
      transmitting, within the same TTI, the data on the first logical channel element on a process corresponding to the first HARQ process ID and the data on the second logical channel element on a process corresponding to the second HARQ process ID.

3. The method according to claim 2, wherein:
   the configuration message is used to indicate a correspondence between the first HARQ process ID and the first logical channel element, and a correspondence between the second HARQ process ID and the second logical channel element; and
   before transmitting the data on the first logical channel element and the data on the second logical channel element, the method further comprises:
      determining, according to the configuration message, the first logical channel element corresponding to the first HARQ process ID and the second logical channel element corresponding to the second HARQ process ID.

4. The method according to claim 1, wherein:
   the scheduling signaling comprises a third HARQ process ID, and the HARQ process ID comprises the third HARQ process ID; and
   transmitting the data on the first logical channel element and the data on the second logical channel element comprises:
      transmitting, within the same TTI, on a process corresponding to the third HARQ process ID, the data on the first logical channel element and the data on the second logical channel element.

5. The method according to claim 4, wherein:
   the configuration message is used to indicate a correspondence between the third HARQ process ID and the first logical channel element and the second logical channel element; and
   before transmitting the data on the first logical channel element and the data on the second logical channel element, the method further comprises:
      determining, according to the configuration message, the first logical channel element and the second logical channel element that correspond to the third HARQ process ID.

6. The method according to claim 1, wherein:
   the scheduling signaling comprises a fourth HARQ process ID and a fifth HARQ process ID, and the HARQ process ID comprises the fourth HARQ process ID and the fifth HARQ process ID; and
   transmitting the data on the first logical channel element and the data on the second logical channel element comprises:
      transmitting, within the same TTI, the data on the first logical channel element on a process corresponding to the fourth HARQ process ID and the data on the second logical channel element on a process corresponding to the fifth HARQ process ID.

7. The method according to claim 6, wherein:
   the configuration message is used to indicate a correspondence between the fourth HARQ process ID and the first logical channel element, and a correspondence between the fifth HARQ process ID and the second logical channel element; and
   before transmitting the data on the first logical channel element and the data on the second logical channel element, the method further comprises:
      determining, according to the configuration message, the first logical channel element corresponding to the fourth HARQ process ID and the second logical channel element corresponding to the fifth HARQ process ID.

8. A device, applied to user equipment (UE), comprising a processor and a non-transitory computer readable storage medium, wherein the non-transitory computer readable storage medium comprises a program stored therein, and when the program runs, the processor is configured to perform:
   receiving a configuration message sent by the base station, wherein the configuration message is used to indicate a correspondence between a hybrid automatic repeat request (HARQ) process ID and a logical channel element, wherein the logical channel element comprises a first logical channel element and a second logical channel element, and the first logical channel element and the second logical channel element corresponds to a same HARQ process ID or different HARQ process IDs;
   receiving scheduling signaling sent by the base station, wherein the scheduling signaling comprises the HARQ process ID; and
   transmitting, within a same transmission time interval (TTI), on a process corresponding to the HARQ process ID, data on the first logical channel element and data on the second logical channel element.

9. The device according to claim 8, wherein:
   the scheduling signaling comprises first scheduling signaling and second scheduling signaling, the first scheduling signaling comprises a first HARQ process ID, and the second scheduling signaling comprises a second HARQ process ID, and the HARQ process ID comprises the first HARQ process ID and the second HARQ process ID; and
   when the program runs, processor is configured to transmit the data on the first logical channel element and the data on the second logical channel element by:

transmitting, within the same TTI, the data on the first logical channel element on a process corresponding to the first HARQ process ID and the data on the second logical channel element on a process corresponding to the second HARQ process ID.

10. The device according to claim 9, wherein
the configuration message is used to indicate a correspondence between the first HARQ process ID and the first logical channel element, and a correspondence between the second HARQ process ID and the second logical channel element; and
when the program runs, the processor is further configured to, before transmitting the data on the first logical channel element and the data on the second logical channel element, determine, according to the configuration message, the first logical channel element corresponding to the first HARQ process ID, and the second logical channel element corresponding to the second HARQ process ID.

11. The device according to claim 8, wherein:
the scheduling signaling comprises a third HARQ process ID, and the HARQ process ID comprises the third HARQ process ID; and
when the program runs, the processor is configured to transmit the data on the first logical channel element and the data on the second logical channel element by:
transmitting, within the same TTI, on a process corresponding to the third HARQ process ID, the data on the first logical channel element and the data on the second logical channel element.

12. The device according to claim 11, wherein
the configuration message is used to indicate a correspondence between the third HARQ process ID and the first logical channel element and the second logical channel element; and
the processor is further configured to, before transmitting the data on the first logical channel element and the data on the second logical channel element, determine, according to the configuration message, the first logical channel element and the second logical channel element that correspond to the third HARQ process ID.

13. The device according to claim 8, wherein:
the scheduling signaling comprises a fourth HARQ process ID and a fifth HARQ process ID, and the HARQ process ID comprises the fourth HARQ process ID and the fifth HARQ process ID; and
when the program runs, the processor is configured to transmit the data on the first logical channel element and the data on the second logical channel element by:
transmitting, within the same TTI, the data on the first logical channel element on a process corresponding to the fourth HARQ process ID and the data on the second logical channel element on a process corresponding to the fifth HARQ process ID.

14. The device according to claim 13, wherein
the configuration message is used to indicate a correspondence between the fourth HARQ process ID and the first logical channel element, and a correspondence between the fifth HARQ process ID and the second logical channel element; and
the processor is further configured to, before transmitting the data on the first logical channel element and the data on the second logical channel element, determine, according to the configuration message, the first logical channel element corresponding to the fourth HARQ process ID and the second logical channel element corresponding to the fifth HARQ process ID.

15. The device according to claim 8, wherein the configuration message comprises the HARQ process ID, first identifier information of the first logical channel element, and second identifier information of the second logical channel element.

16. A device, applied to a base station, comprising a processor and a non-transitory computer readable storage medium, wherein the non-transitory computer readable storage medium comprises a program stored therein, and when the program runs, the processor is configured to perform:
sending a configuration message to user equipment (UE), wherein the configuration message is used to indicate a correspondence between a hybrid automatic repeat request (HARQ) process ID and a logical channel element, wherein the logical channel element comprises a first logical channel element and a second logical channel element, and the first logical channel element and the second logical channel element corresponds to a same HARQ process ID or different HARQ process IDs;
generating scheduling signaling, wherein the scheduling signaling comprises the HARQ process ID; and
sending the scheduling signaling to the UE, to instruct the UE to transmit, within a same transmission time interval (TTI), on a process corresponding to the HARQ process ID, data on the first logical channel element and data on the second logical channel element.

17. The device according to claim 16, wherein the scheduling signaling comprises first scheduling signaling and second scheduling signaling, and the first scheduling signaling comprises a first HARQ process ID and the second scheduling signaling comprises a second HARQ process ID, and the HARQ process ID comprises the first HARQ process ID and the second HARQ process ID.

18. The device according to claim 17,
wherein the configuration message is used to indicate a correspondence between the first HARQ process ID and the first logical channel element, and a correspondence between the second HARQ process ID and the second logical channel element.

19. The device according to claim 16, wherein:
the scheduling signaling comprises a third HARQ process ID, and the HARQ process ID comprises the third HARQ process ID; and
the configuration message is used to indicate a correspondence between the third HARQ process ID and the first logical channel element and the second logical channel element.

20. The device according to claim 16, wherein:
the scheduling signaling comprises a fourth HARQ process ID and a fifth HARQ process ID, and the HARQ process ID comprises the fourth HARQ process ID and the fifth HARQ process ID; and
the configuration message is used to indicate a correspondence between the fourth HARQ process ID and the first logical channel element, and a correspondence between the fifth HARQ process ID and the second logical channel element.

\* \* \* \* \*